United States Patent [19]

Mukawa

[11] Patent Number: 5,268,882
[45] Date of Patent: Dec. 7, 1993

[54] MAGNETIC HEAD HOLDING APPARATUS

[75] Inventor: Hiroshi Mukawa, Tokyo, Japan

[73] Assignee: Sony Corporation, Tokyo, Japan

[21] Appl. No.: 987,462

[22] Filed: Dec. 8, 1992

[30] Foreign Application Priority Data

Dec. 11, 1991 [JP] Japan ................................. 3-350923

[51] Int. Cl.⁵ ..................... G11B 11/10; G11B 13/04; G11B 21/12
[52] U.S. Cl. ..................................... 369/13; 360/105; 360/114
[58] Field of Search ....................... 360/104, 105, 114; 369/13

[56] References Cited

U.S. PATENT DOCUMENTS

| | | | |
|---|---|---|---|
| 4,208,684 | 6/1980 | Janssen et al. | 360/104 |
| 4,399,476 | 8/1983 | King | 360/104 |
| 4,670,804 | 6/1987 | Kant et al. | 360/105 |
| 4,843,502 | 6/1989 | Tagawa | 360/105 |
| 5,020,041 | 5/1991 | Nakao et al. | 360/114 |
| 5,142,424 | 8/1992 | Hatamura | 360/104 |
| 5,168,484 | 12/1992 | Wachi et al. | 360/114 |

*Primary Examiner*—Stuart S. Levy
*Assistant Examiner*—Joseph A. Rhoa
*Attorney, Agent, or Firm*—Philip M. Shaw, Jr.

[57] ABSTRACT

A magneto-optical positioning apparatus for synchronously positioning both a magnetic pickup device and an optical pickup device over the tracks of a disc and including an arm member, a magnetic head, a pair of parallel first support links, each of the first support links being integrally formed with and hinged at one end to the arm member and hinged at another end to the magnetic head, the first support links forming a first parallelogram linkage allowing the magnetic head to follow fluctuations of the disk in a plane perpendicular to a recording surface of the disc while maintaining the magnetic head parallel to the recording surface, a base support, and a pair of parallel second support links, each of the second support links being integrally formed with and hinged at one end to the arm member and hinged at another end to the base support to form a second parallelogram linkage for raising and lowering the arm member towards and away from the recording surface of the disk while maintaining the arm substantially parallel with the recording surface of the disc, and wherein the first support links are arranged one above the other relative to the recording surface of the disc and the second support links are arranged one above the other relative to the recording surface of the disc.

8 Claims, 6 Drawing Sheets

MAGNETIC HEAD HOLDING APPARATUS

BACKGROUND OF THE INVENTION

1. The present invention generally relates to a magneto-optical disc recording and/or reproducing apparatus which writes and/or reads an information signal on and/or from a writable disc and, more particularly, is directed to a magnetic head holding apparatus for holding a magnetic head of the type such that the magnetic head is brought in contact with a magneto-optical disc.

2. Description of the Related Art

Conventional magneto-optical disc recording and/or reproducing apparatus employ a gimbal spring or the like to cause a magnetic head, which is used to generate an external magnetic field onto a magneto-optical disc, to come in contact with the surface of the magneto-optical disc to write and/or read an information signal in and/or from the magneto-optical disc.

This contact type magneto-optical disc recording and/or reproducing apparatus includes a mechanism for retracting the magnetic head so that the magnetic head can be prevented from coming in contact with the magneto-optical disc when the magneto-optical disc or cartridge type disc is loaded on and/or ejected from the magneto-optical disc recording and/or reproducing apparatus. As an example of such retracting mechanism, there is known an apparatus in which an upper lid is opened and/or closed about a hinge shaft. In this conventional apparatus, an arm that holds the magnetic head is rotated about the fulcrum shaft in a ganged relation with the upper lid.

If, however, the above system in which the head holding arm is rotated in a ganged relation with the open and/or close of the upper lid is applied to the above recording and/or reproducing apparatus in which the magneto-optical disc or cartridge disc is loaded by a so-called slot-in loading system, then the entire arrangement of the apparatus becomes large in size, which therefore hinders the apparatus from being made compact in size. Further, as the magnetic head holding arm is utilized repeatedly, the magnetic head holding arm is fluctuated in operation because of an accuracy problem. There is then the problem such that the magnetic head cannot record and/or reproduce an information signal on and/or from the magneto-optical disc at its desired position accurately.

OBJECTS AND SUMMARY OF THE INVENTION

Therefore, it is an object of the present invention to provide an improved magnetic head holding apparatus in which the aforesaid shortcomings and disadvantages encountered with the prior art can be eliminated.

More specifically, it is an object of the present invention to provide a magnetic head holding apparatus which can prevent a magneto-optical disc recording and/or reproducing apparatus of a slot-in type from becoming large in size when applied thereto.

It is another object of the present invention to provide a magnetic head holding apparatus by which a magnetic head can record and/or reproduce an information signal on and/or from a magneto-optical disc at its desired position with high accuracy.

The above and other objectives are achieved by the present invention of a magneto-optical optical positioning apparatus for synchronously positioning both a magnetic pickup device and an optical pickup device over the tracks of a disc, the apparatus comprising an arm member, a magnetic head, a pair of parallel first support links, each of the first support links being integrally formed with and hinged at one end to the arm member and hinged at another end to the magnetic head, the first support links forming a first parallelogram linkage allowing the magnetic head to follow fluctuations of the disk in a plane perpendicular to a recording surface of the disc while maintaining the magnetic head parallel to the recording surface, a base support, and a pair of parallel second support links, each of the second support links being integrally formed with and hinged at one end to the arm member and hinged at another end to the base support to form a second parallelogram linkage for raising and lowering the arm member towards and away from the recording surface of the disk while maintaining the arm substantially parallel with the recording surface of the disc. The first support links are arranged one above the other relative to the recording surface of the disc and the second support links are arranged one above the other relative to the recording surface of the disc.

DETAILED DESCRIPTION OF THE PREFERRED EMBODIMENTS

The present invention will now be described with reference to the drawings.

Figure 1:
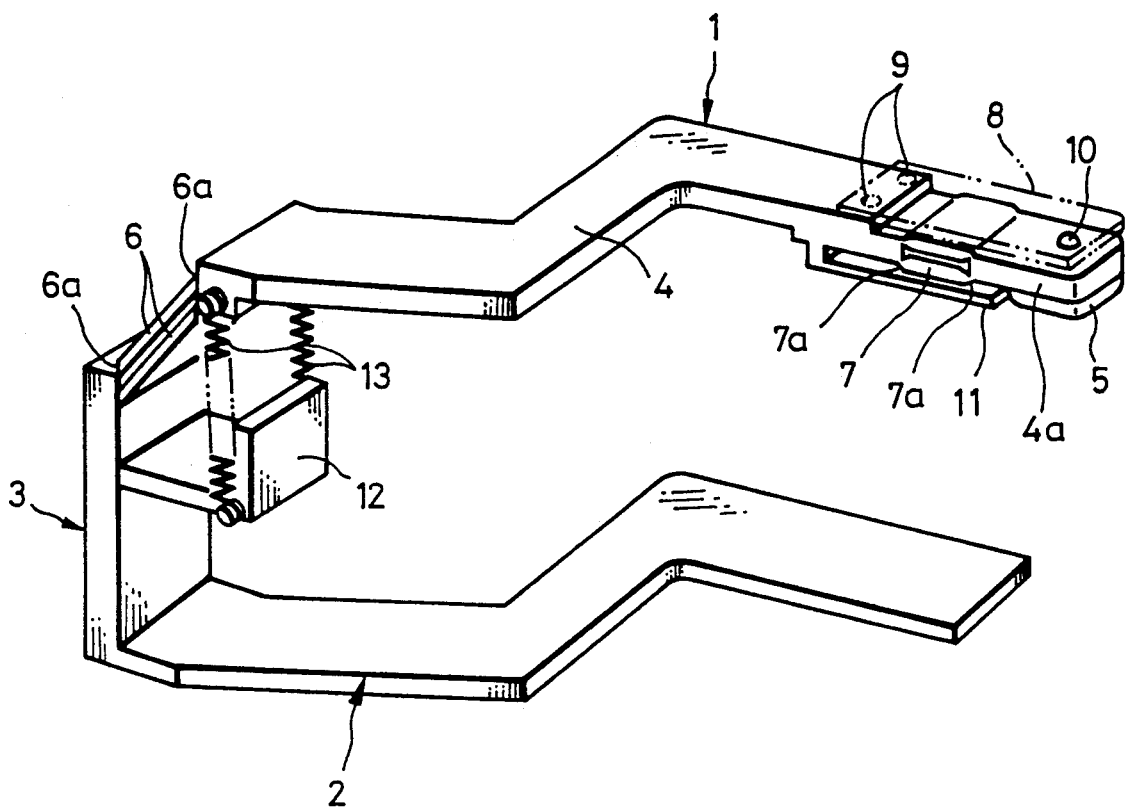
FIG. 1 is a perspective view showing a magnetic head holding apparatus according to an embodiment of the present invention.
Figure 2:
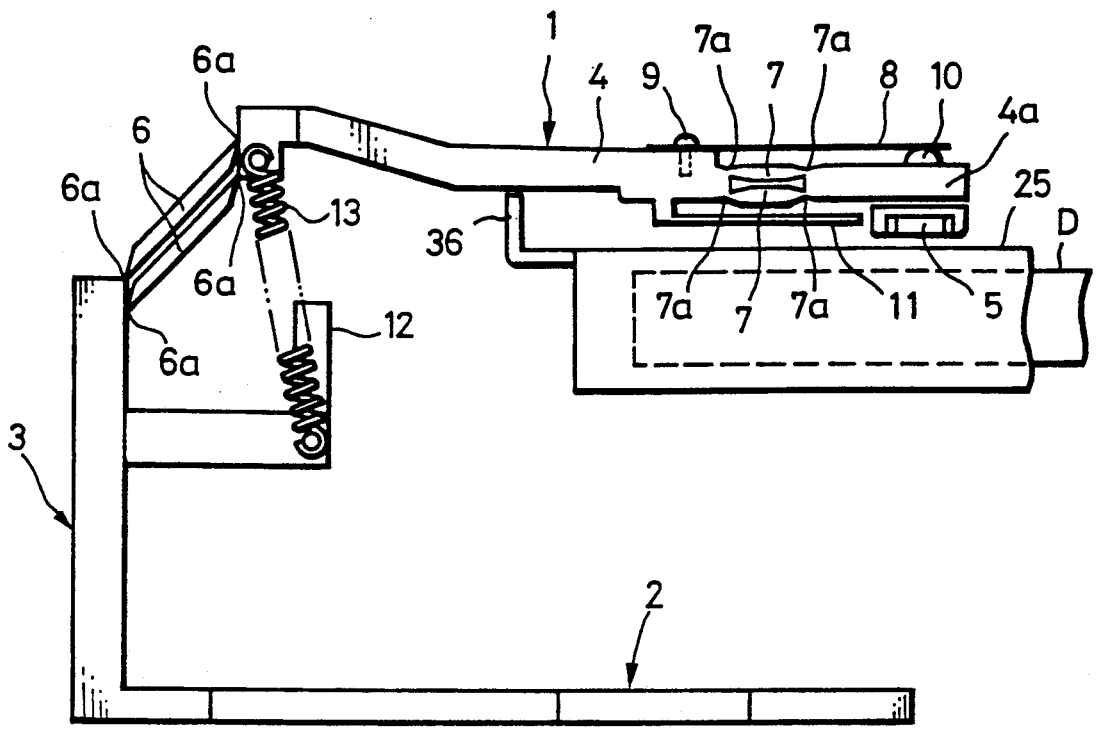
FIG. 2 is a side view of the magnetic head holding apparatus under the condition that the magnetic head is retracted.
Figure 3:
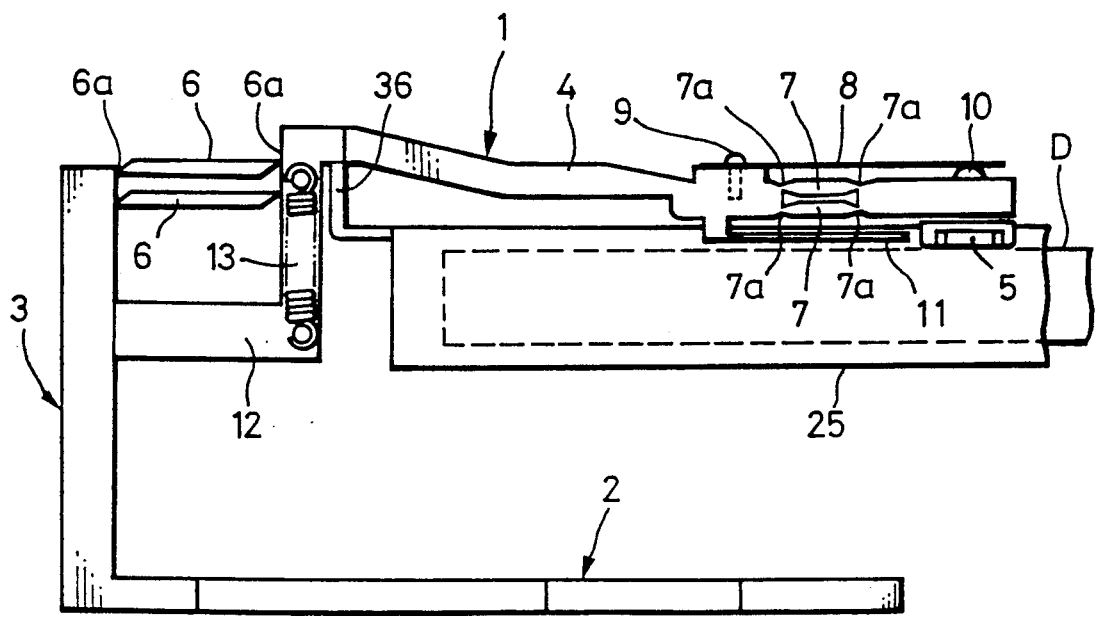
FIG. 3 is a side view of the magnetic head holding apparatus under the condition that the magnetic head is brought in contact with the surface of the magneto-optical disc.

FIG. 1 of the accompanying drawings is a perspective view showing a magnetic head holding apparatus according to an embodiment of the present invention. FIGS. 2 and 3 of the accompanying drawings show the magnetic head holding apparatus under respective operation conditions which will be described later on. As a magneto-optical disc used in this embodiment, there is employed a cartridge type disc (hereinafter referred to as a disc cartridge).

A magnetic head holding apparatus, generally depicted by reference numeral 1 in FIGS. 1 to 3, has substantially a U-letter configuration that comprises a supporting base plate 2 attached to an optical pickup device (not shown) that is located substantially in parallel to the supporting base plate 2 and a coupling member 3 for vertically coupling one end of the head holding apparatus 1 to one end of the supporting base plate 2.

A main portion of the head holding apparatus 1 is composed of an arm member 4 formed of a rigid plate-shaped member having a predetermined width made of hard plastic such as a nylon or the like. On the rear surface of the front end portion (right end portion in FIG. 2) of the arm member 4, there is provided a magnetic head 5 which opposes an objective lens of an optical pickup device (not shown) that is moved in a ganged relation with the supporting base plate 2. A rear end portion of the arm member 4 is integrally coupled with the upper end portion of the coupling member 3 by means of upper and lower parallel links 6, 6. More specifically, The upper and lower two parallel links 6, 6 have thin resilient hinges 6a, 6a having predetermined lengths in the width direction formed on the coupled portion of the arm member 4 and the coupling member 3. Accordingly, the arm member 4 can be moved only in the upper and lower direction in the parallel state when the parallel links 6, 6 resiliently deform the resilient hinges 6a, 6a in the thickness direction while the parallel links 6, 6 are keeping a rigidity in the width direction. Together, the coupling member 3, the links 6, 6 and the end of the arm closest to the coupling member 3 form a first parallelogram linkage.

On the front end side of the arm member 4 and at the rear portion of the magnetic head 5, there are formed second upper and lower parallel links 7, 7 in which upper and lower thin resilient hinges 7a, 7a having predetermined lengths in the width direction of the arm member 4 are formed. Therefore, the front end portion of the arm member 4 serves as a head side arm member 4a on which the magnetic head 5 is mounted. That is, the head side arm member 4a becomes swingable only in the upper and lower direction when the second parallel links 7, 7 resiliently displace the resilient hinges 7a, 7a in the thickness direction while the second parallel links 7, 7 are keeping a rigidity in the width direction. Together, the end of the arm 4 closest to the magnetic head, the links 7, 7, and the head side arm member 4a form a second parallelogram linkage.

Reference numeral 8 designates a leaf spring that is secured at its one end on to the upper surface of the arm member 4 by screws 9. The leaf spring 8 pushes the head side arm member 4a through a convex portion 10 by the spring force thereof so that the magnetic head 5 is urged against the surface of the magneto-optical disc (not shown) with a suitable pressure. Reference numeral 11 designates a stopper member extended from the arm member 4 to the rear surface side of the head side arm member 4a. The stopper member 11 restricts the head side arm member 4a from being moved by the leaf spring 8 more than is necessary, thereby preventing the resilient displacing members 7a, 7a from being deformed to excess.

The head holding apparatus 1 thus arranged is restricted in lower limit position when a rear surface of a base portion of the arm member 4 is brought in contact with the top surface of a restricting member 12 attached to the coupling member 13. The head holding apparatus 1 is constantly spring-biased toward a disc cartridge D by a spring force of a compression spring 13 interposed between the arm member 4 and the restricting member 12.

Figure 4:
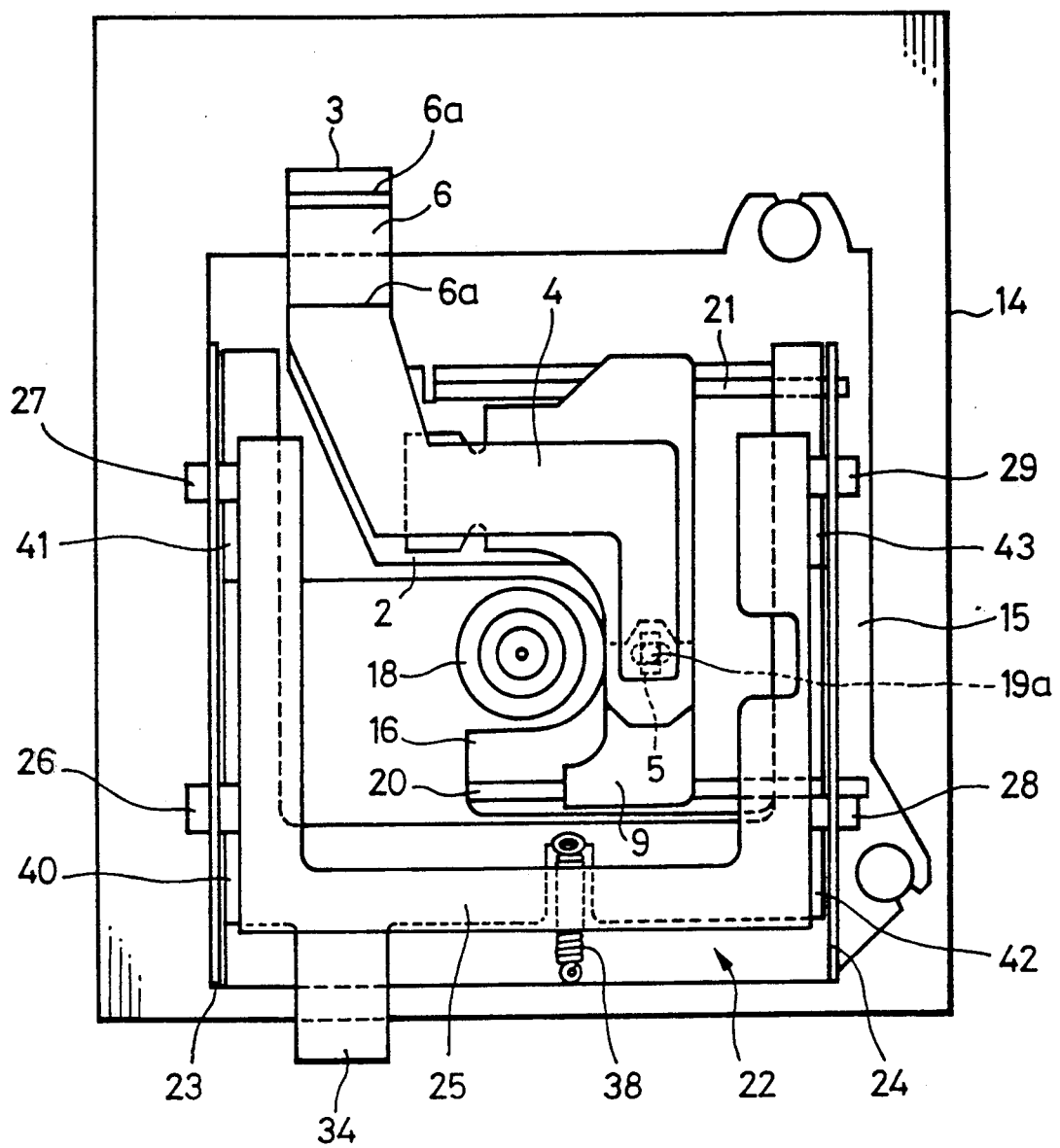
FIG. 4 is a plan view showing a magneto-optical disc recording and/or reproducing apparatus to which the magnetic head holding apparatus according to the present invention is applied.
Figure 5:
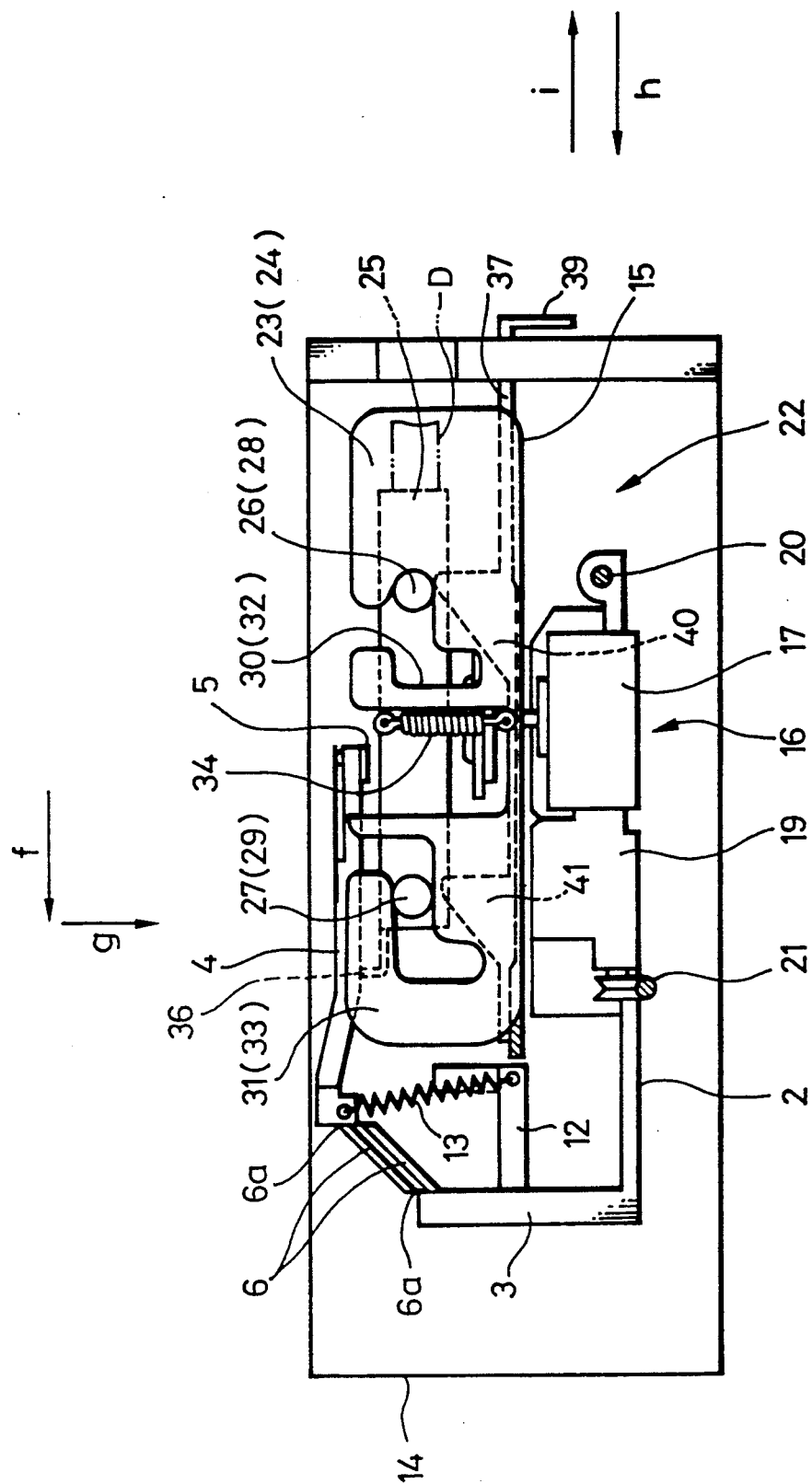
FIG. 5 is a side view showing the condition that the recording and/or reproducing apparatus is in the eject operation mode.

FIGS. 4 and 5 of the accompanying drawings show a plan view and a side view of a magneto-optical disc recording and/or reproducing apparatus that includes the thus arranged magnetic head holding apparatus according to the present invention. Main portions of the magneto-optical disc recording and/or reproducing apparatus will be described below.

As illustrated, on a chassis 15 supported to an outer casing 14 of the magneto-optical disc recording and/or reproducing apparatus, there is disposed a rotary operating apparatus 16 onto which there is loaded the disc cartridge D. The rotary operating apparatus 16 comprises a spindle motor 17 and a disc table 18 that is attached to a drive shaft of the spindle motor 17. An optical pickup device 19 is disposed on the chassis 15.

The optical pickup device 19 can be moved in the vicinity of the spindle moor 17, i.e., the spacing from the inner peripheral side to the outer peripheral side of a magneto-optical disc (not shown) accommodated within the disc cartridge D loaded onto the disc table 18. That is, the optical pickup device 19 is supported by a guide shaft 20 and a supporting shaft 21 disposed in parallel to the guide shaft 20 so that it can be moved in the inner and/or outer peripheral direction of the magneto-optical disc.

The supporting base plate 2 integrally coupled to the aforementioned magnetic head holding apparatus 1 is secured to the optical pickup device 19. Therefore, the magnetic head holding apparatus 1 is moved in synchronism with the optical pickup device 19 when the optical pickup device 19 is moved in the inner and/or outer peripheral direction of the magneto-optical disc. In other words, the magnetic head 5 disposed at the front end portion of the magnetic head holding apparatus 1 and a objective lens 19a (see FIG. 4) of the optical pickup device 19 are moved in synchronism with each other under the condition such that they are opposed to each other across the magneto-optical disc (not shown) accommodated within the disc cartridge D.

There is provided a loading mechanism 22 for loading the disc cartridge D onto the rotary operating apparatus 16. As shown in FIG. 4, in the loading mechanism 22, opposing side plate portions 23, 24 are erected on the chassis 15 across the disc table 18.

A disc cartridge holder 25 into which the disc cartridge D is inserted is disposed between the side plate portions 23 and 24 so that it is located above the disc table 18. The disc cartridge holder 25 has a housing-shaped configuration so that the front side thereof is opened to accept the disc cartridge D and a part of the lower surface opposing the chassis 15 and a part of the upper surface opposing the lower surface are opened. Pairs of supporting shafts 26, 27 and 28, 29 are protrusively formed on the disc cartridge holder 25 at its both side portions opposing the side plate portions 23, 24. The supporting shafts 26, 27 formed on the disc cartridge holder 25 at one side portion opposing one side plate portion 23 are correspondingly fitted into guide slits 30, 31 formed through one side plate portion 23. The supporting shafts 28, 28 formed on the disc cartridge holder 25 at the other side portion corresponding to the other side plate portion 24 are correspondingly fitted into guide slits 32, 33 formed through the other side plate portion 24.

As described above, the disc cartridge holder 25 is supported to the pair of side plate portions 23, 24 by fitting the respective supporting shafts 26, 27, 28, 29 into the guide shafts 30, 31, 32 and 33 correspondingly. Each of the guide slits 30, 31, 32 and 33 has an L-letter configuration which comprises a portion parallel to the chassis 15 and a portion curved from the rear side of this parallel portion to the chassis 15 side. That is, the disc cartridge holder 25 is supported to the side plate portions 23, 24 in such a fashion that it can be moved rearwardly along the chassis 15 as shown by an arrow f in FIG. 5 and then moved in the direction in which it approaches the chassis 15 as shown by an arrow g in FIG. 5.

Figure 6:
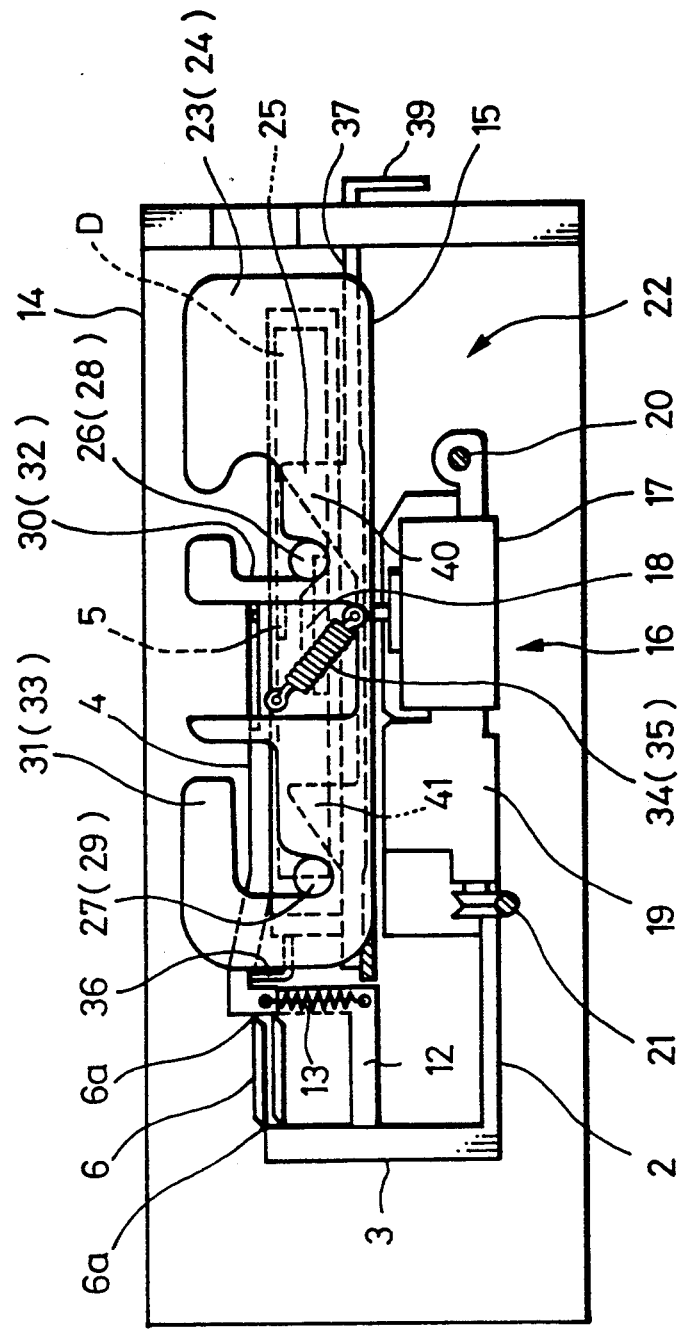
FIG. 6 is a side view showing the condition that the recording and/or reproducing apparatus is in the loading operation mode.

A pair of tension coil springs 34, 35 are extended between the disc cartridge holder 25 and the two side plate portion 23, 24. The tension coil springs 34, 35 are attached to the disc cartridge holder 25 at its substantially central portions of both sides so that they become substantially vertical to the chassis 15 when the disc cartridge holder 25 is located at the front side. Therefore, when the disc cartridge holder 25 is moved rearwardly, the disc cartridge holder 25 is spring-biased by the tension coil springs 34, 35 so as to move in the lower front direction. When the respective shafts 26, 27, 28 and 29 reach the rear end portions of the guide slits 30, 31, 32 and 33, as shown in FIG. 6, the disc cartridge holder 25 is moved in the direction in which it approaches the chassis 15.

When the disc cartridge holder 25 is located in the front side, as shown in FIG. 5, an operation member 36 provided at the rear end portion of the disc cartridge holder 25 pushes the arm member 4 of the magnetic head holding apparatus 1 upwardly. More specifically, as shown in FIG. 2, the arm member 4 is moved upwardly and in the horizontal direction supported by the parallel links 6, 6 against the spring force of the compression spring 13 together with the head side arm member 4a, thereby retracting the magnetic head 5 to the position at which the magnetic head 5 comes away from the disc cartridge D.

When the arm member 4 is moved toward the chassis 15 side while the disc cartridge holder 25 is moved rearwardly at the same time, the operation member 36 of the disc cartridge holder 25 is released from the arm member 4. As a consequence, the arm member 4 is horizontally lowered by the parallel hinges 6, 6 by the spring force of the compression spring 13 as shown in FIG. 3 and then stopped when the base end of the arm member 4 is brought in contact with the restricting member 12. The lower limit position of the arm member 4 is the position at which the magnetic head 5 is brought in contact with the surface of the magneto-optical disc accommodated within the disc cartridge D with the result that the magnetic head 5 is brought in contact with the surface of the magneto-optical disc only by the spring force of the leaf spring 8. Therefore, the lower limit position of the arm member 4 becomes a position at which an information signal is written in and/or read from the magneto-optical disc.

An eject mechanism will be described. An eject plate 37 is disposed between the chassis 15 and the disc cartridge holder 25. The eject plate 37 is disposed between the chassis 15 and the disc cartridge holder 25 so that it can be slid on the chassis 15 in the front and rear direction. The eject plate 37 is spring-biased in the front side shown by an arrow i in FIG. 5 by a tension coil spring 38 (see FIG. 4) interposed between the chassis 15 and the front portion of the eject plate 37. A pushing operation portion 39 is disposed at the front end portion of the eject plate 37. When the pushing operation portion 39 is pushed, the eject plate 37 is moved against the spring force of the tension coil spring 38 in the rear side shown by an arrow h in FIG. 5.

Pairs of eject cams 40, 41, 42, 43 are projected from both side portions of the eject plate 37 along the respective side plate portions 23, 24. Each of the eject cams 40, 41, 42 and 43 has an inclined cam portion which is inclined so as to approach at its rear side rather than the front side to the chassis 15. Accordingly, when the eject plate 37 is moved rearwardly, the eject cams 40, 41, 42 and 43 are brought in contact with the respective shafts 26, 27, 28 and 29 located at the rear end portions of the guide slits 30, 31, 32 and 33 from the chassis 15 side.

The eject operation of the eject plate 37 is effected as follows. When the eject operation that the eject plate 37 is moved rearwardly against the spring force of the tension coil spring 38 by pushing the pushing operation portion 39 is effected, the eject plate 37 is moved rearwardly against the spring force of the tension coil spring 38. Then, the eject cams 40, 41, 42 and 43 come in contact with the respective supporting shafts 26, 27, 28 and 29 from the chassis 15 side one by one to thereby move the disc cartridge holder 25 through these supporting shafts 26, 27, 28 and 29 in the direction in which the disc cartridge holder 25 comes away from the chassis 15. When the disc cartridge holder 25 is moved in the direction in which it comes away from the chassis 15, the disc cartridge holder 25 is moved by the spring force of the pair of tension coil springs 30, 31 along the chassis 15 in the front side that is the opposite direction to the arrow f direction in FIG. 5. As the disc cartridge holder 25 is moved in the front side as described above, the operation member 36 of the disc cartridge holder 25 pushes upwardly the arm member 4 of the magnetic head holding apparatus 1 about the parallel links 6, 6 serving as the rotating fulcrums, whereby the magnetic head holding apparatus 1 can be isolated from the disc cartridge D but also the disc cartridge D can be ejected from the outer housing 14.

In the magnetic head holding apparatus thus arranged according to the present invention, the arm portion 4 having the magnetic head 5 mounted thereon is horizontally moved upwardly and/or downwardly about the parallel links 6, 6 which are integrally formed with the arm member 4 when the magneto-optical disc is ejected from and/or loaded onto the magneto-optical disc recording and/or reproducing apparatus. Thus, when the magnetic head holding apparatus is applied to the slot-in type magneto-optical disc recording and/or reproducing apparatus, the arrangement of the entire apparatus can be prevented from becoming large in size more than is necessary. Thus, the magneto-optical disc recording and/or reproducing apparatus can be avoided from becoming large in size.

Further, since the resilient hinges 6a, 6b of the parallel links 6, 6 have a rigidity in the width direction (lateral direction) of the arm member 4, the resilient hinges 6a, 6a can be prevented from being twisted and deformed in the width direction. Therefore, since the magnetic head 5 can be moved upwardly and/or downwardly with high positional accuracy, the magnetic head 5 can record and/or reproduce an information signal on and/or from the magneto-optical disc at its desired position with high accuracy.

Furthermore, the magnetic head 5 is mounted on the head side arm member 4a integrally formed with the arm member 4 through the second parallel links 7, 7 that can be moved upwardly or downwardly. Thus, even when the magneto-optical disc is fluctuated in rotation due to a skew or the like, the resilient hinges 7a, 7a of the second parallel links 7, 7 are deformed by the spring force of the leaf spring 8 so that the magnetic head 5 can constantly follow the surface of the magneto-optical disc with high accuracy. There is then the advantage such that a magnetic field can be accurately generated on the magneto-optical disc surface. Therefore, the second parallel links 7, 7 can serve as the conventional gimbal spring from an action standpoint.

While the second parallel links 7 and 7 are integrally formed with the arm member 4 as described above, the present invention is not limited thereto and the second parallel links 7 and 7 may be formed of separate members. An example of the second parallel links will be described below with reference to FIG. 7 of the accompanying drawings.

Figure 7:
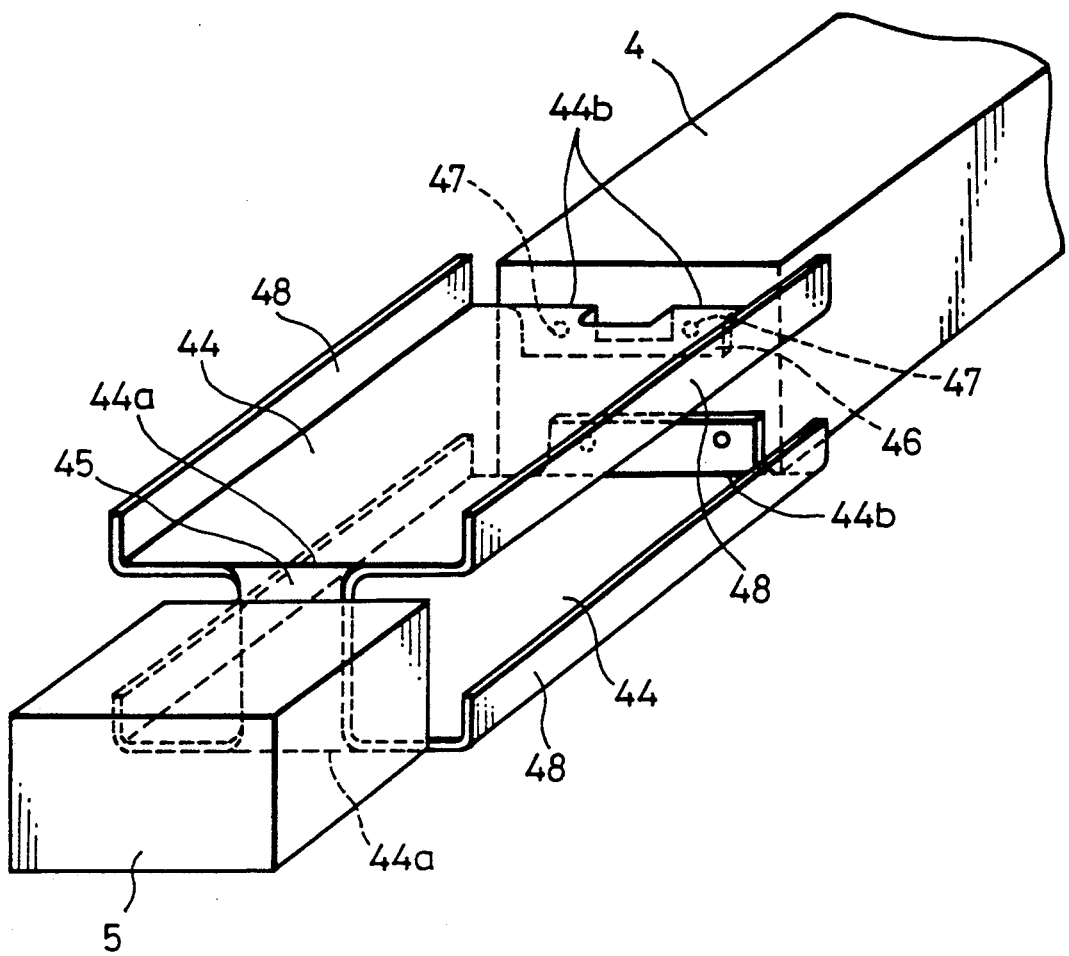
FIG. 7 is a perspective view showing another example of second parallel hinge portions used in the present invention.

As shown in FIG. 7, parallel hinge portions 44, 44 according to a second embodiment of the present invention are formed of thin plate members having a predetermined width made of metal or synthetic resin, One end sides of the parallel links 44, 44 are formed integrally by a coupling member 45 which is shorter than the width of the parallel links 44, 44. The parallel links 44, 44 have a U-letter configuration on the whole. The two parallel links 44, 44 are attached at their bent attaching members 46, 46 to the top surface of the arm member 4 by means of screws 47. The magnetic head 5 is attached to the coupling member 45.

Flange portions 48 are formed on the longitudinal edge portions of the parallel links 44, 44 and the parallel links 44, 44 themselves have a rigidity. Bent deforming portions 44a, 44a between the parallel links 44, 44 and the coupling portion 45 and bent deforming portions 44b, 44b of the attaching members 46, 46 can be deformed resiliently in the thickness direction. Therefore, the parallel links 44, 44 are effectively hinged in the upper and lower direction by the resilient displacement of the bent deforming portions 44a, 44a and 44b, 44b so that the magnetic head 5 can follow the surface of the magneto-optical disc even though the rotation of the magneto-optical disc is fluctuated.

Further, if the parallel links 44, 44 thus arranged are formed of, in particular, metal thin plate members, then the rigidity of the bent deforming portions 44a, 44a and 44b, 44b in the width direction can be increased. Therefore, the magnetic head 5 can record and/or reproduce an information signal on and/or from the magneto-optical disc at its desired position with higher accuracy.

Furthermore, while the magneto-optical disc recording and/or reproducing apparatus in and/or from which the disc cartridge D is loaded and/or ejected in the horizontal condition has been described so far, the present invention is not limited thereto and can be applied to a magneto-optical disc recording and/or reproducing apparatus in and/or from which the disc cartridge D is loaded and/or ejected in the vertical direction.

In addition, the present invention is not limited to the magneto-optical disc and can be applied to a variety of magneto-optical discs other than the cartridge type disc.

As described above, according to the present invention, the arm member on which the magnetic head is mounted can be moved in parallel about the parallel links formed integrally with the arm member and the magnetic head is swingably rotated about the second links so that the magnetic head can follow the surface of the magneto-optical disc. Therefore, when the magnetic head holding apparatus of the present invention is applied to the magneto-optical disc recording and/or reproducing apparatus of the slot-in type, the overall arrangement of the apparatus can be prevented from becoming larger than is necessary, which can contribute to the miniaturization of the magneto-optical disc recording and/or reproducing apparatus.

Since the rigidity of the hinges for the parallel links in the lateral direction can be increased, the hinges can be prevented from being twisted and deformed. Therefore, the magnetic head can record and/or reproduce an information signal on and/or from the magneto-optical disc at its desired position with high accuracy. Further, since the arm member and the parallel links are formed integrally, the magnetic head holding apparatus of the present invention can be manufactured inexpensively. Furthermore, since the second parallel links serve as shock-absorbers to enable the magnetic head to follow the magneto-optical disc, the magnetic head holding apparatus can be made more inexpensive.

Having described preferred embodiments of the invention with reference to the accompanying drawings, it is to be understood that the invention is not limited to those precise embodiments and that various changes and modifications thereof could be effected therein by one skilled in the art without departing from the spirit or scope of the invention as defined in the appended claims.

What is claimed is:

1. A magneto-optical positioning apparatus for synchronously positioning both a magnetic pickup device and an optical pickup device over the tracks of a disc, the apparatus comprising:
   an arm member;
   a magnetic head;
   a pair of parallel first support links, each of the first support links being integrally formed with and hinged at one end to the arm member and hinged at another end to the magnetic head, the first support links forming a first parallelogram linkage allowing the magnetic head to follow fluctuations of the disk in a plane perpendicular to a recording surface of the disc while maintaining the magnetic head parallel to the recording surface;
   a base support; and
   a pair of parallel second support links, each of the second support links being integrally formed with and hinged at one end to the arm member and hinged at another end to the base support to form a second parallelogram linkage for raising and lowering the arm member towards and away from the recording surface of the disk while maintaining the arm substantially parallel with the recording surface of the disc, and
   wherein the first support links are arranged one above the other relative to the recording surface of the disc and the second support links are arranged one above the other relative to the recording surface of the disc.

2. The apparatus according to claim 1 and further comprising a coupling member connected to the arm member via the second support links, the coupling member allowing the optical pickup device and the magnetic head to be synchronously positioned.

3. The apparatus according to claim 2 wherein the coupling member includes a restricting member that restricts the arm member from moving toward the surface of the disk.

4. The apparatus according to claim 1 wherein the arm member is formed as a resilient plate-shaped member made of hard plastic.

5. The apparatus according to claim 1 wherein each hinge of the first links includes a plurality of thin resilient displacement portions that each have a predetermined length in the width direction of the arm member, the displacement portions coupling the arm member and the magnetic head to each of the first links.

6. The apparatus according to claim 1 wherein each hinge of the second links includes a plurality thin resilient displacement portions that each have a predetermined length in the width direction of the arm member.

7. The apparatus of claim 4 wherein the hard plastic is nylon.

8. The apparatus according to claim 1 and further comprising a spring having a fixed end and a bias end, the fixed end of the spring being connected to the arm member, the bias end biasing the magnetic head towards the disk.

* * * * *